(12) United States Patent
Heo

(10) Patent No.: US 7,046,588 B2
(45) Date of Patent: May 16, 2006

(54) METHOD AND APPARATUS FOR RECORDING AND REPRODUCING AUDIO HIGHLIGHT PORTION AND RECORDING MEDIUM FOR STORING ADDITIONAL INFORMATION FOR THE SAME

(75) Inventor: Jung-kwon Heo, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1028 days.

(21) Appl. No.: 09/736,359

(22) Filed: Dec. 15, 2000

(65) Prior Publication Data

US 2001/0037430 A1    Nov. 1, 2001

Related U.S. Application Data

(60) Provisional application No. 60/246,573, filed on Nov. 8, 2000.

(30) Foreign Application Priority Data

Apr. 27, 2000    (KR) .............................. 2000-22465

(51) Int. Cl.
*G11B 21/08*    (2006.01)
*H04N 5/928*    (2006.01)

(52) U.S. Cl. ................. 369/32.01; 369/30.07; 386/126; 386/96; 386/105

(58) Field of Classification Search ............ 369/30.06, 369/30.05, 33, 34, 1, 83–84, 30.19, 30.07, 369/32.01, 47.1, 47.15; 386/68, 124, 80–81, 386/96, 105, 126; 711/112, 154
See application file for complete search history.

(56) References Cited

U.S. PATENT DOCUMENTS

| | | | |
|---|---|---|---|
| 5,717,923 A | 2/1998 | Dedrick ...................... 707/102 |
| 5,848,032 A * | 12/1998 | Yokota et al. ........... 369/30.07 |
| 6,026,213 A | 2/2000 | Higurashi et al. ............ 386/68 |
| 6,029,195 A * | 2/2000 | Herz .......................... 725/116 |
| 6,587,403 B1 * | 7/2003 | Keller et al. ............. 369/30.06 |
| 6,766,103 B1 * | 7/2004 | Kim et al. .................... 386/96 |

FOREIGN PATENT DOCUMENTS

KR    10-0189512    1/1999

* cited by examiner

*Primary Examiner*—Ali Neyzari
(74) *Attorney, Agent, or Firm*—Stein, McEwen & Bui, LLP

(57) ABSTRACT

A method and apparatus for recording and/or reproducing an audio highlight portion of an audio selection, and a recording medium for storing additional information therefor. A particular portion is designated on an audio track as a representative portion of the audio track. Reproduction related information for reproducing the representative portion is recorded to a predetermined area on the recording medium. Accordingly, a user can easily identify the contents of the track, such as for example, music, within a short time even if many different audio selections are recorded to individual audio tracks on a recording medium.

54 Claims, 12 Drawing Sheets

HIGHLIGHTED PORTION
OF TRACK 1

HIGHLIGHTED PORTION
OF TRACK 2

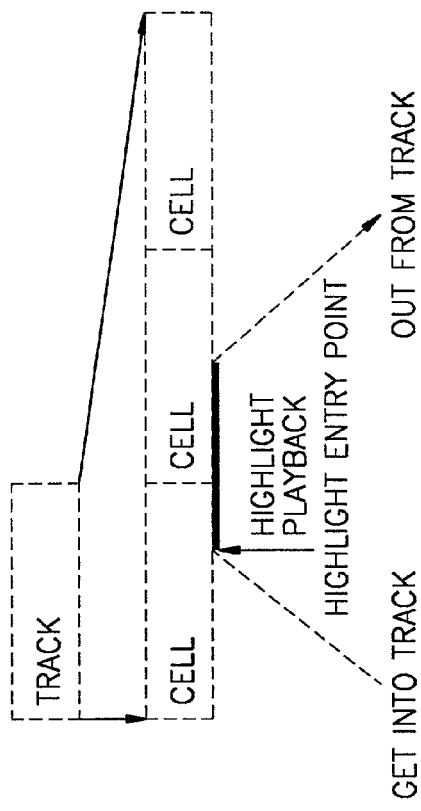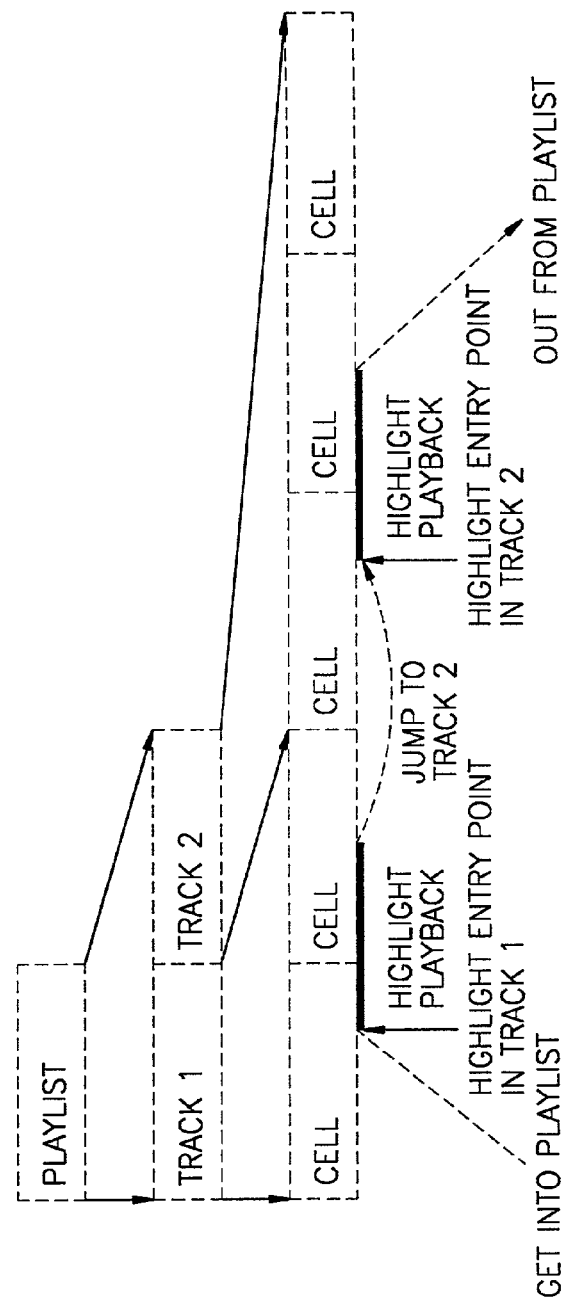
FIG. 4A
FIG. 4B

000# METHOD AND APPARATUS FOR RECORDING AND REPRODUCING AUDIO HIGHLIGHT PORTION AND RECORDING MEDIUM FOR STORING ADDITIONAL INFORMATION FOR THE SAME

CROSS-REFERENCE TO RELATED APPLICATIONS

This application claims the benefit of Korean Application No. 00-22465 filed Apr. 27, 2000, in the Korean Patent Office, and the benefit of U.S. Provisional Application No. 60/246,573 filed Nov. 8, 2000 in the United States Patent and Trademark Office, the disclosures of which are incorporated herein by reference.

BACKGROUND OF THE INVENTION

1. Field of the Invention

The present invention relates to audio recording and reproducing, and more particularly, to a method and apparatus for designating an audio portion that a user wishes to mark as a highlight portion, recording the audio portion on a recording medium and reproducing the audio highlight portion, and a recording medium for storing additional information for the same audio highlight portion.

2. Description of the Related Art

When a plurality of pieces of music are recorded on a recording medium such as a compact disc (CD), a digital audio tape (DAT), a digital versatile disc (DVD)-audio or a mini disc (MD), an intro function is used to identify music which a user wants to reproduce in conventional technology. According to the conventional intro function, all the pieces of music recorded on a recording medium are sequentially reproduced such that the opening portion of each piece of music is reproduced for about 10 seconds.

FIG. 1 shows an example of a conventional intro function on a CD. Referring to FIG. 1, at operation S1, a user selects an intro function. At operation S2, a CD player jumps to a first track on a CD loaded thereon. At operation S3, the opening portion of data of the first track is reproduced for about 10 seconds. After reproducing the data of the first track for about 10 seconds, at operation S4, the CD player determines whether there is another track from which data will be reproduced. When it is determined that there is another track from which data will be reproduced, at operation S5, the CD player jumps to the next track. Then, the operation S3 is performed. On the other hand, when it is determined that there is no track from which data will be reproduced at operation S4, the CD player terminates reproduction. A CD loaded on the CD player may have a plurality of tracks, and one or more pieces of music can be recorded on one track.

The opening portion of most music is recorded on a recording medium with an audio signal having a very small amount of audio data, or the opening portion of the piece may not be a portion by which the piece is most easily recognized. Accordingly, it is difficult for a user to identify reproduced music using an intro function of reproducing the opening portion of music for about 10 seconds.

SUMMARY OF THE INVENTION

To solve the above problem, it is a first object of the present invention to provide a method of designating a predetermined portion on an audio track as a highlight portion and is recording information related to reproduction of the highlight portion.

It is a second object of the present invention to provide a method of designating a certain portion of an audio track as a highlight portion during recording of the data of the audio track, and of recording information related to reproduction of the highlight portion.

It is a third object of the present invention to provide a method of designating a certain portion as a highlight portion based on a reproduced audio signal and of recording information related to reproduction of the highlight portion.

It is a fourth object of the present invention to provide a method of designating predetermined portions of audio tracks as highlight portions in the course of recording or reproducing data to or from the audio tracks, collecting and managing position information of a plurality of highlight portions of audio tracks in the form of a reproduction list, and recording information related to reproduction of the highlight portions.

It is a fifth object of the present invention to provide a method of reproducing only a highlight portion of data recorded on an audio track on a recording medium depending on a user's request.

It is a sixth object of the present invention to provide a method of sequentially reproducing the highlight portions of a plurality of audio tracks linked to a playlist when the audio tracks are linked to each other through the playlist.

It is a seventh object of the present invention to provide a method of reproducing data from a particular track through a last track linked to a playlist in response to a command input by a user in the course of reproducing the highlight portions of a plurality of audio tracks included in the playlist when the audio tracks are linked to each other through the playlist.

It is an eighth object of the present invention to provide a method of reproducing data from first through last tracks linked to a playlist in response to a command input by a user in the course of reproducing the highlight portions of a plurality of audio tracks included in the playlist when the audio tracks are linked to each other through the playlist.

It is a ninth object of the present invention to provide an apparatus for designating a certain portion of an audio track as a highlight portion in the course of recording or reproducing data to or from the audio track and for recording information related to the reproduction of the highlight portion.

It is a tenth object of the present invention to provide an apparatus for reproducing only highlight portions designated on audio tracks on a recording medium.

It is an eleventh object of the present invention to provide a recording medium for storing information related to the reproduction of highlight portions of audio tracks.

Additional objects and advantages of the invention will be set forth in part in the description which follows, and, in part, will be obvious from the description, or may be learned by practice of the invention.

Accordingly, to achieve the objects of the invention, there is provided a recording method including designating a particular portion on a track as a representative portion of the track when recording or reproducing data to or from a recording medium including a plurality of tracks, and recording reproduction related information for reproducing the representative portion to a predetermined area on the recording medium.

To achieve the objects of the invention, there is provided a method of reproducing data from a recording medium including a plurality of tracks, wherein representative portions for representing some or all tracks are designated and to which reproduction related information for reproducing the representative portions is recorded. The method includes reading from the recording medium the reproduction related information of the representative portion requested to be reproduced, analyzing the reproduction related information, and reproducing the representative portion requested to be reproduced based on the analyzed reproduction related information.

To achieve the objects of the invention, there is provided a recording and reproducing apparatus including an encoder which encodes input data and records encoded data to a recording medium and/or a decoder which decodes data read from the recording medium. The recording and reproducing apparatus includes a system controller which generates reproduction related information for reproducing a representative portion when a particular portion of the track is designated as the representative portion when data is being recorded to or reproduced from a recording medium including a plurality of tracks, and a recording controller which records the reproduction related information to a predetermined area on the recording medium.

To achieve the objects of the invention, there is provided an apparatus for reproducing data from a recording medium including a plurality of tracks, wherein representative portions for representing some or all tracks are designated and to which reproduction related information for reproducing the representative portions is recorded. The apparatus includes a system controller for reading the reproduction related information of the representative portion of a track request to be reproduced from the recording medium and analyzing the reproduction related information, and a reproduction processor for reading and reproducing the representative portion based on the analyzed reproduction related information.

To achieve the objects of the invention, there is provided a recording medium including an area comprising a track to which data is recorded, and a predetermined area to which reproduction related information for reproducing a representative portion of a designated track is recorded.

BRIEF DESCRIPTION OF THE DRAWINGS

The above objectives and advantages of the present invention will become more apparent by describing in detail embodiments thereof with reference to the attached drawings in which:

FIGS. 4A and 4B are diagrams illustrating digital versatile disc (DVD)-audio recording formats, cells and reproduction list structures;

DESCRIPTION OF THE PREFERRED EMBODIMENTS

Figure 1:
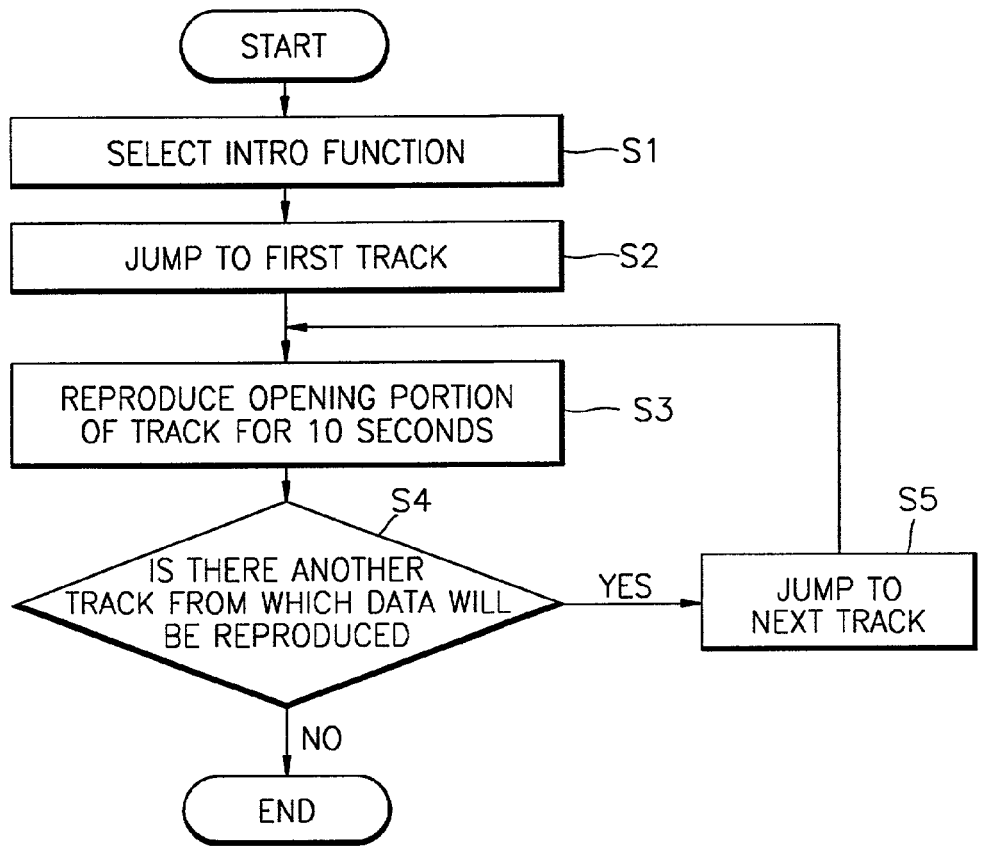
FIG. 1 is a flowchart illustrating an audio reproducing method using a conventional intro function.

Reference will now be made in detail to the present embodiments of the present invention, examples of which are illustrated in the accompanying drawings, wherein like reference numerals refer to like elements throughout. Hereinafter, embodiments of a method and apparatus for recording and reproducing an audio highlight portion of an audio track, also referred to as an audio selection, and a recording medium for storing additional information for the audio highlight portion according to the present invention will be described in detail with reference to the attached drawings.

In the present invention, a certain portion of an audio track is designated as a highlight portion and is used to represent the audio track. The highlight portion is also referred to as a representative portion or a sample portion and can be linked to a visual menu.

Figure 2:
FIG. 2 illustrates examples of an audio track on which a highlight portion is designated according to the present invention.
Figure 2:
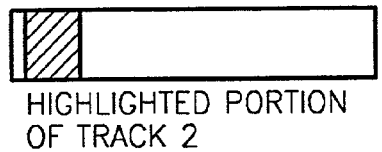

As shown in FIG. 2, each audio track has a highlight portion. Audio tracks may have highlight portions having different lengths at different locations thereon. Unlike a conventional intro function, the present invention allows a user to designate a desired portion as a highlight portion. Accordingly, when a highlight portion is reproduced, a user can easily determine whether a current audio track is what the user wants.

Figure 3A:
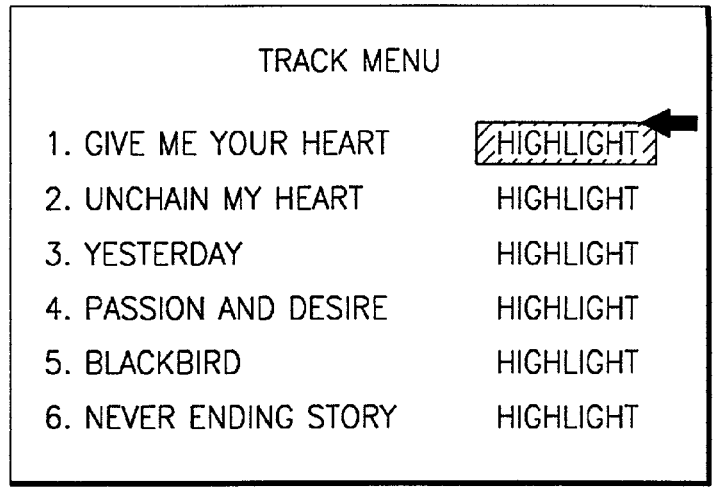
FIGS. 3A through 3C are diagrams for explaining the link between audio highlight portions and a visual menu.
Figure 3B:
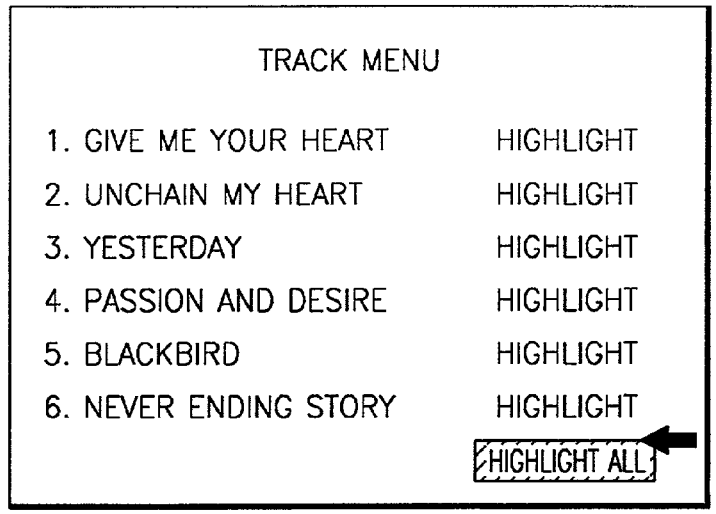
Figure 3C:
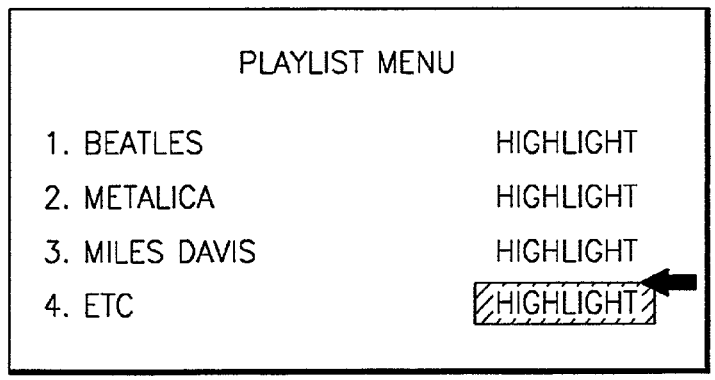

As shown in FIGS. 3A through 3C, such a highlight portion can be linked to a visual menu. The visual menu may have link information for activating the reproduction of a highlight portion. When link information is activated by the selection of a user, a highlight portion corresponding to the link information is reproduced, and the user can easily determine whether an audio track including the highlight portion is what the user wants.

In FIG. 3A, which illustrates a case where link information for individual highlight portions of respective audio tracks is displayed in a visual menu, the highlight portion of a first audio track selected by a user will be reproduced through corresponding link information.

In FIG. 3B, which illustrates a case where the highlight portions of all tracks on a medium can be reproduced in a visual menu, when a selection command ("HIGHLIGHT ALL" in the visual menu) for reproducing all the highlight portions is input by a user, the highlight portions of all the audio tracks are sequentially reproduced. If there is a track for which a highlight portion is not designated, the opening portion of the track may be set to be reproduced for a predetermined time as in a conventional intro function to substitute for a highlight portion.

In FIG. 3C, when a playlist comprising link information for linking a plurality of audio tracks is selected and activated through a visual menu, the highlight portions of all the audio tracks linked to the playlist are sequentially reproduced. For a track for which a highlight portion is not designated, the opening portion of the track may be set to be reproduced for a predetermined time as in a conventional intro function to substitute for a highlight portion.

In a DVD-audio recording format, information on a single audio track comprises a plurality of cells. Each cell stores information on an entry point included therein. An entry point is an information structure indicating that an event designated by the entry point can be performed at a time designated by the entry point.

FIG. 4A illustrates an example of an audio track comprising cells, in which a highlight entry point is assigned to a first cell, and the highlight portion ends in a second cell. Highlight portion information related to the reproduction of a highlight portion is stored at the entry point of a cell included in a track. Accordingly, a reproducing apparatus reproduces starting from data at a start time designated by a highlight entry point and terminates the reproduction at an end point designated by the highlight entry point.

FIG. 4B illustrates an example of a playlist which is linked to two tracks, in which a first track comprises 2 cells, and a second track comprises 3 cells. Each track has a highlight portion. Highlight portion information related to the reproduction of a highlight portion of each track of a playlist is stored at the entry point of a cell included in the track. Accordingly, a reproducing apparatus reproduces a highlighted portion of the first track linked to the playlist and then reproduces a highlighted portion of the second track.

Figure 5:
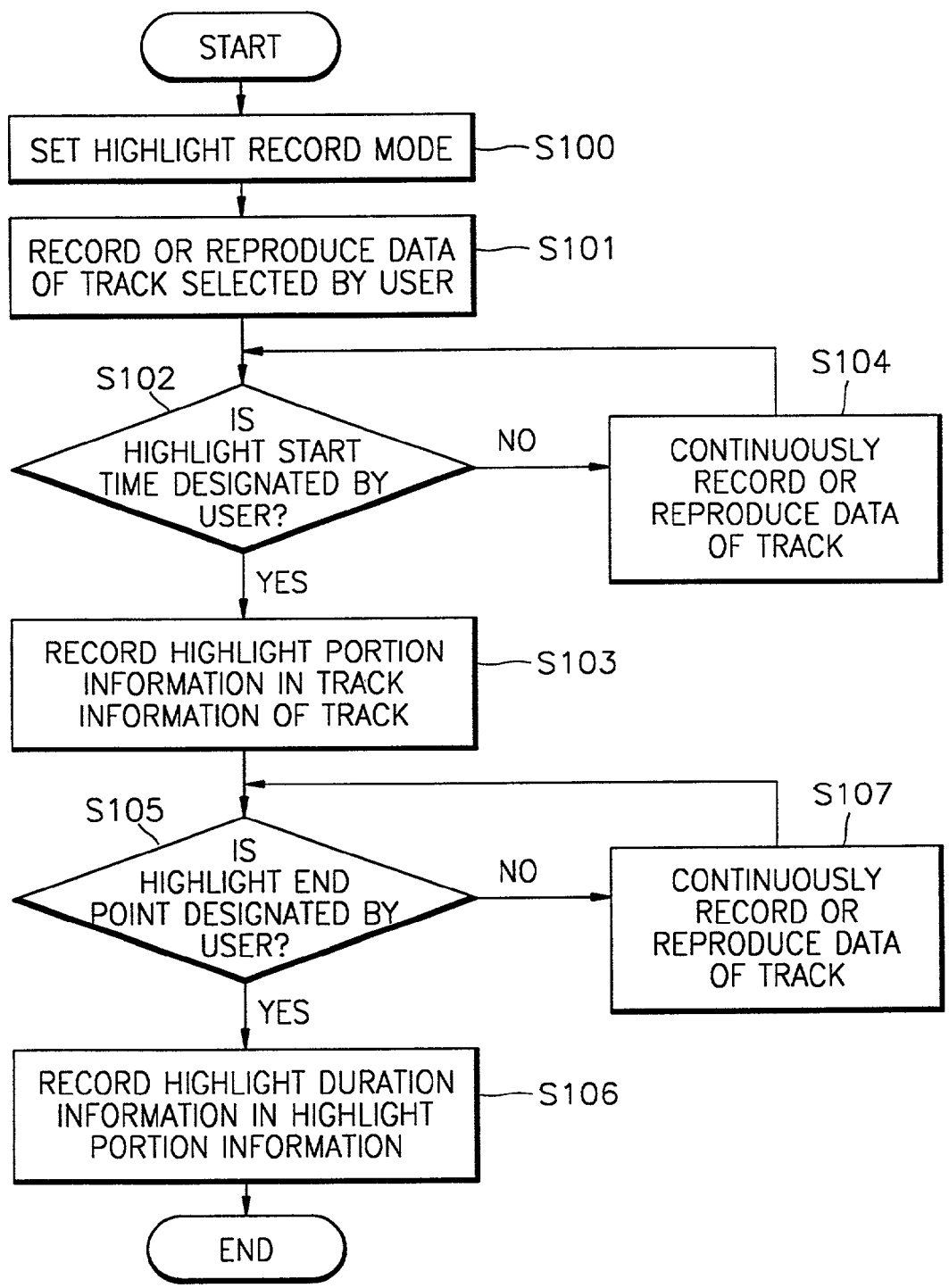
FIG. 5 is a flowchart illustrating a method of recording an audio highlight portion according to an embodiment of the present invention.

In FIG. 5, which is a flowchart illustrating a method of recording an audio highlight portion according to an embodiment of the present invention, once a user sets a highlight record mode at operation S100, the data of a track selected by the user is recorded or reproduced at operation S101. At operation S102, the user designates a highlight start time at a point which is considered to be able to be a highlight start point. At operation S103, highlight portion information is recorded in the track information of the track. The highlight start time of the highlight portion is recorded in the highlight portion information. However, when the highlight start time is not designated by the user at operation S102, at operation S104, the data of the track is continuously recorded or reproduced until the highlight start time is designated.

When the user designates a particular point as the end point of the highlight portion at operation S105 in the course of recording or reproducing the data of the track, highlight duration information is recorded in the highlight portion information at operation S106. Then, the highlight record mode ends. The highlight duration information denotes the time length of the highlight portion. When the user does not designate the highlight end point at operation S105, the data of the track is continuously recorded or reproduced until the end point is designated.

In the case of such a DVD-audio recording format, highlight portion information is stored at an entry point of a highlight portion. Here, the entry point is in a cell corresponding to the time when the highlight portion was designated. At operation S103, the start time information of the highlight portion is recorded at the entry point of the highlight portion. At operation S106, the duration information of the highlight portion is also recorded at the entry point of the highlight portion.

According to the recording method illustrated in FIG. 5, a highlight portion is designated while the data of a single track is being recorded or reproduced. Accordingly, after the operation S106, an operation of determining whether a highlight portion is to be designated for the next audio track may be further provided to continuously designate highlight portions of a plurality of audio tracks on a given recording medium by repeatedly performing the operations S101 through S107. This method may further include an operation of generating playlist information comprising link information for linking a plurality of audio tracks, for which highlight portions are designated, to a playlist.

Figure 6:
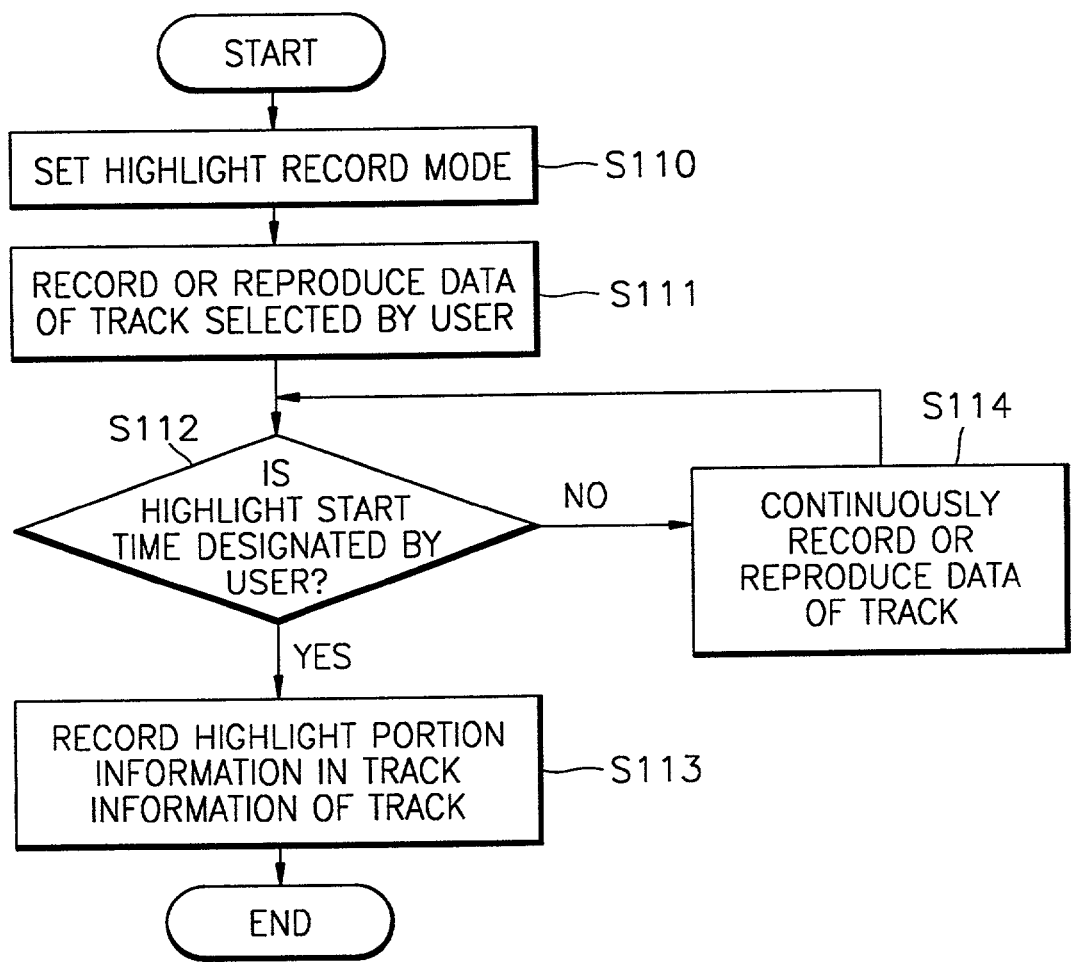
FIG. 6 is a flowchart illustrating a method of recording an audio highlight portion according to another embodiment of the present invention.

In FIG. 6, which is a flowchart illustrating a method of recording an audio highlight portion according to another embodiment of the present invention, only the start time of a highlight portion is designated by a user, and the duration of the highlight portion is designated by a recording and reproducing apparatus.

When a highlight record mode is set by a user at operation S110, the data of a track selected by the user is recorded or reproduced at operation S111. During recording or reproduction, when the user designates a highlight start time at a point which is considered to be able to be a highlight start point at operation S112, highlight portion information is recorded in track information of the track at operation S113. Then, the highlight record mode ends. The highlight start time of the highlight portion is recorded in the highlight portion information. When the highlight start time is not designated by the user at operation S112, at operation S114, data of the track is continuously recorded or reproduced.

In the case of such a DVD-audio recording format, highlight portion information is stored at an entry point of a highlight portion. Here, the entry point is in a cell corresponding to the time when the highlight portion was designated. Accordingly, at operation S113, the start time information of the highlight portion is recorded at the entry point of the highlight portion. Predetermined highlight duration information designated by a recording apparatus may be recorded at the entry point. Alternatively, highlight duration information is not recorded during recording operation, and a reproducing apparatus performs reproduction for a predetermined duration when reproducing a highlight portion.

The recording method illustrated in FIG. 6 may further include an operation of determining whether a highlight portion is to be designated for the next audio track after the operation S113, to continuously designate highlight portions of a plurality of audio tracks on a given recording medium by repeatedly performing the operations S111 through S114. In addition, this method may further include an operation of generating playlist information comprising link information for linking a plurality of audio tracks, for which highlight portions have been designated, to a playlist.

Figure 7:
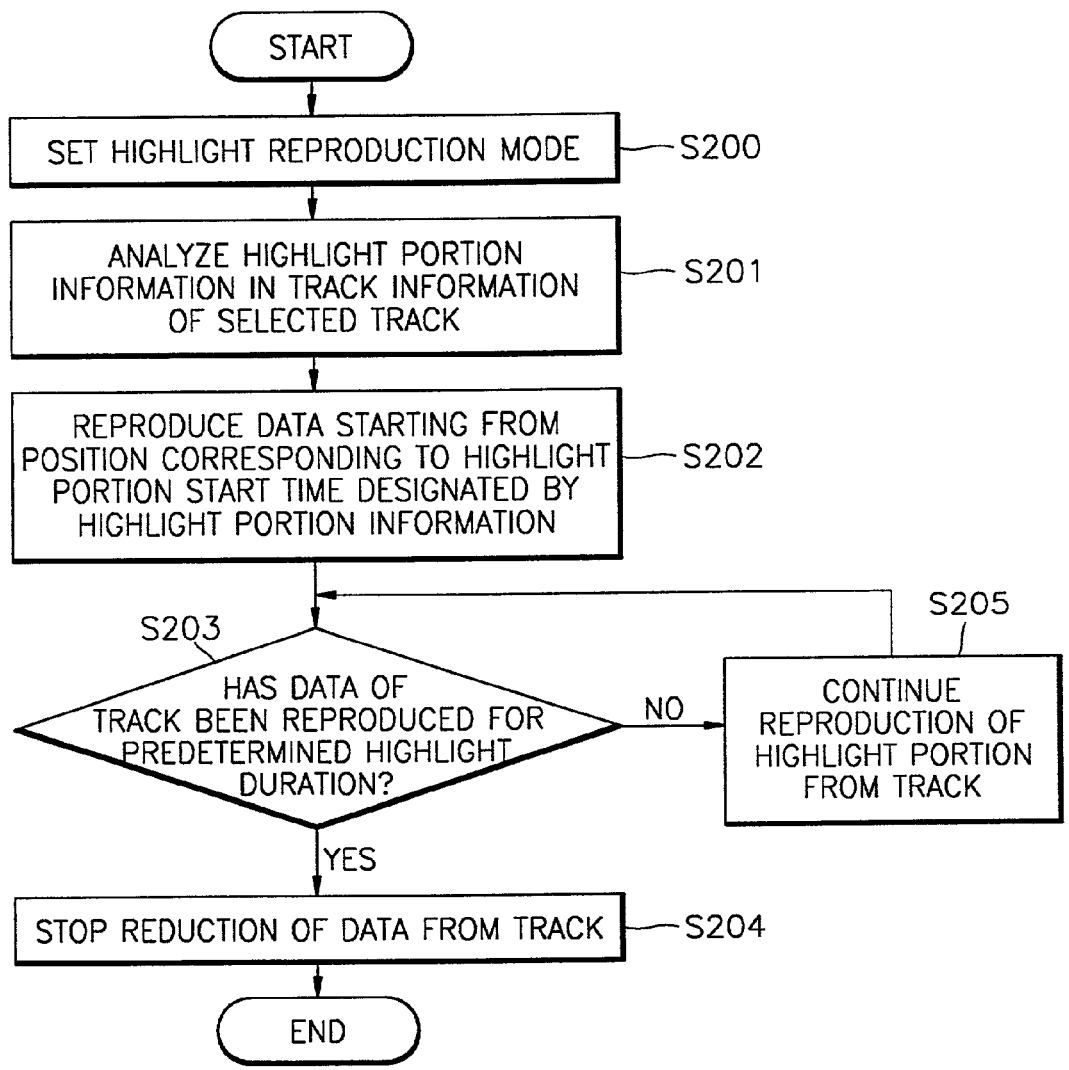
FIG. 7 is a flowchart illustrating a first embodiment of a method of reproducing an audio highlight portion according to the present invention.

In FIG. 7 which is a flowchart illustrating a first embodiment of a method of reproducing an audio highlight portion according to the present invention, a highlight reproduction mode is set at operation S200. In the highlight reproduction mode, the highlight portion of a single audio track selected by a user from a menu such as that shown in FIG. 3A is reproduced. After the highlight reproduction mode is set at operation S200, a reproducing apparatus analyzes highlight portion information in the track information of a selected track at operation S201. At operation S202, the reproducing apparatus reproduces data starting from a position corresponding to highlight portion start time information derived from the analyzed highlight portion information.

When the highlight portion information includes highlight duration information, at operation 203, data is reproduced starting from a position corresponding to the highlight portion start time for the period of time designated by the highlight duration information. Then, at operation S204, the reproducing apparatus stops the reproduction of the highlight portion. When it is determined that the predetermined highlight duration has not lapsed at operation S203, at operation S205, the highlight portion of the track is continuously reproduced until the predetermined highlight duration has expired.

For the case where the highlight portion information does not include duration information, the reproducing apparatus may be designed such that it reproduces data starting from a position corresponding to the highlight portion start time for a predetermined duration and then stops the reproduction.

Figure 8:
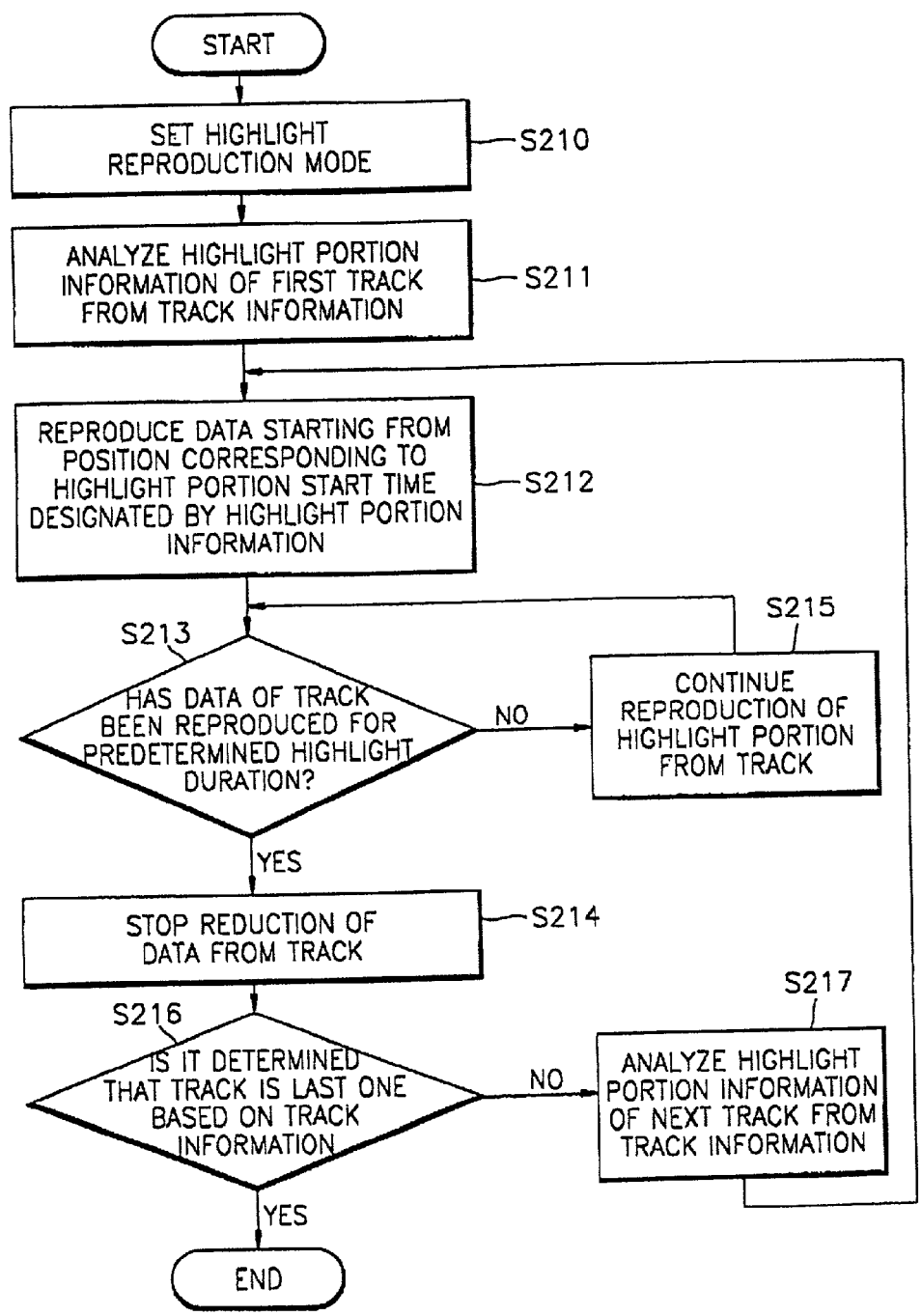
FIG. 8 is a flowchart illustrating a second embodiment of a method of reproducing an audio highlight portion according to the present invention.

In FIG. 8, which is a flowchart illustrating a second embodiment of a method of reproducing an audio highlight portion according to the present invention, a highlight reproduction mode is set at operation S210. In the highlight reproduction mode, the highlight portions of all tracks on a recording medium are reproduced by a user in association with a menu as shown in FIG. 3B.

At operation S211, the highlight portion information of a first track is analyzed from the track information of a given recording medium. At operation S212, the data of the first track is reproduced starting from a position corresponding to a highlight portion start time derived from the analyzed highlight portion information.

At operation S213, it is determined whether the data of the track has been reproduced for a duration designated by highlight duration information derived from the highlight portion information. When it is determined that the data of the track has been reproduced for the derived duration, the reproduction of a highlight portion on the track is terminated at operation S214. On the other hand, when it is determined that the duration has not lapsed, the reproduction of the highlight portion on the track is continued at operation S215.

After the reproduction of the highlight portion on the track is terminated at operation S214, it is determined whether the track is the last one based on the track information at operation S216. When it is determined that there are no more tracks, the highlight reproduction mode ends. On the other hand, when it is determined that there is another track, highlight portion information of the next track is analyzed from the track information at operation S217, and the operations S212 through S216 are repeated. When the highlight portion information does not include highlight duration information, the reproduction is performed for a duration designated by a given reproducing apparatus.

A track on which a highlight portion is not designated may exist on the recording medium. For a track for which a highlight portion is not designated, the opening portion thereof is reproduced as in a conventional intro function to substitute for a highlight portion, in such a mode of reproducing the highlight portions of all tracks on a recording medium.

Figure 9:
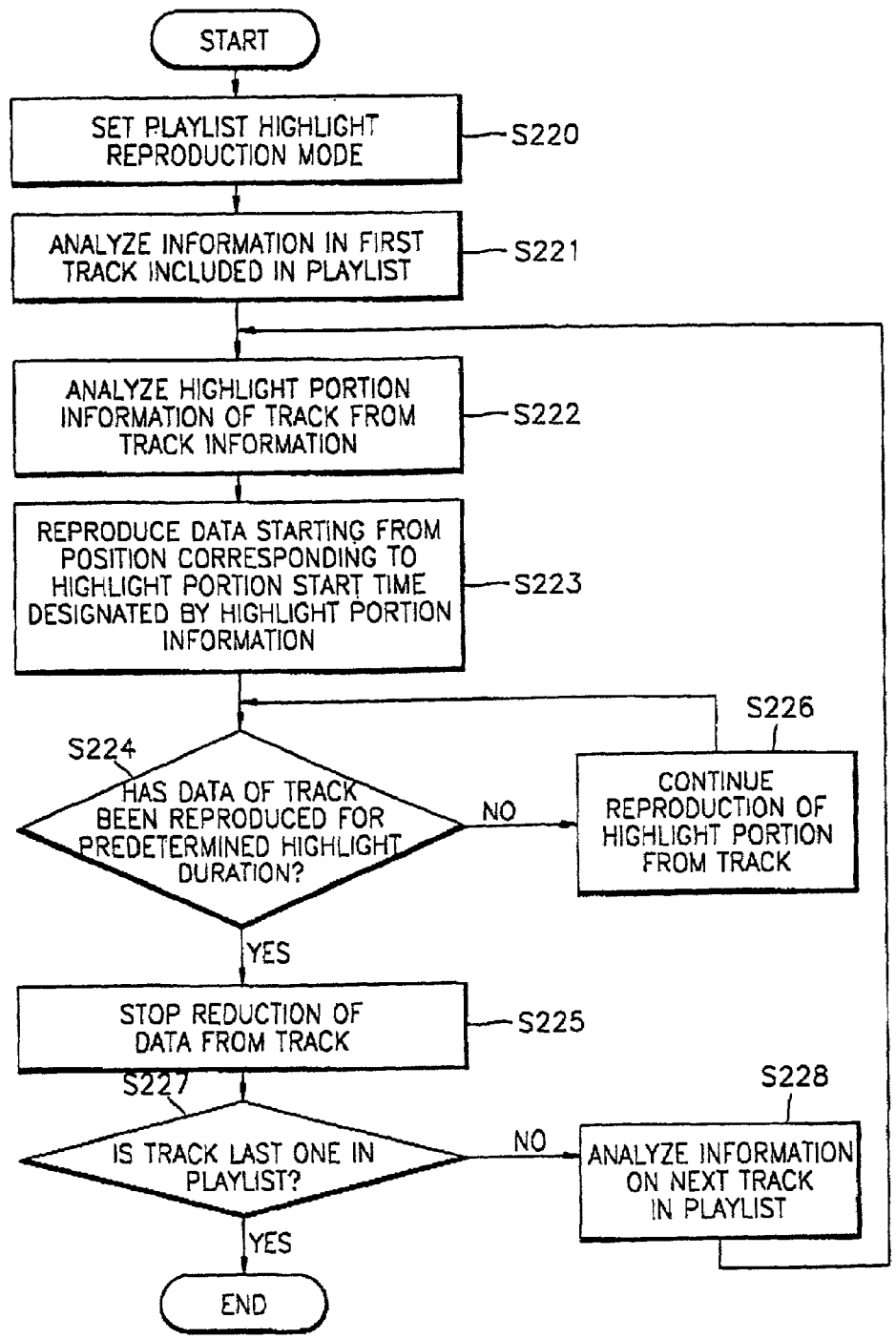
FIG. 9 is a flowchart illustrating a third embodiment of a method of reproducing an audio highlight portion according to the present invention.

In FIG. 9, which is a flowchart illustrating a third embodiment of a method of reproducing an audio highlight portion according to the present invention, a playlist highlight reproduction mode is set at operation S220. In the playlist highlight reproduction mode, the highlight portions of tracks linked to a given playlist are reproduced in association with a menu as shown in FIG. 3C. The playlist comprises link information for linking a plurality of tracks thereto. The playlist does not include independent highlight portion information. The highlight portion information of each track linked to the playlist is stored at an entry point in a cell within the track, as shown in FIG. 4B.

After the playlist highlight reproduction mode is set at operation S220, a reproducing apparatus analyzes information on a first track linked to the playlist at operation S221. At operation S222, highlight portion information is analyzed from the analyzed track information. At operation S223, data is reproduced from the track starting from a position corresponding to a highlight portion start time designated by the highlight portion information. At operation S224, it is determined whether the data of the track has been reproduced for a duration designated by highlight duration information derived from the highlight portion information. When it is determined that the duration has elapsed, the reproduction of the highlight portion of the track is terminated at operation S225. When it is determined that the duration has not elapsed, the highlight portion of the track is continuously reproduced at operation S226 until the duration has elapsed.

After the reproduction of the highlight portion of the track is terminated at operation S225, it is determined whether the track is the last one linked to the playlist at operation S227. When it is determined that there are no more tracks linked to the playlist, the playlist highlight reproduction mode ends. When it is determined that there is another track linked to the playlist, information on the next track linked to the playlist is analyzed in operation 228. Then, the operations S222 through S226 are performed to reproduce a highlight portion starting from a position corresponding to a highlight portion start time on the track for the highlight duration of the track. When highlight portion information does not include highlight duration information, reproduction is performed for a duration designated by a reproducing apparatus.

Figure 10:
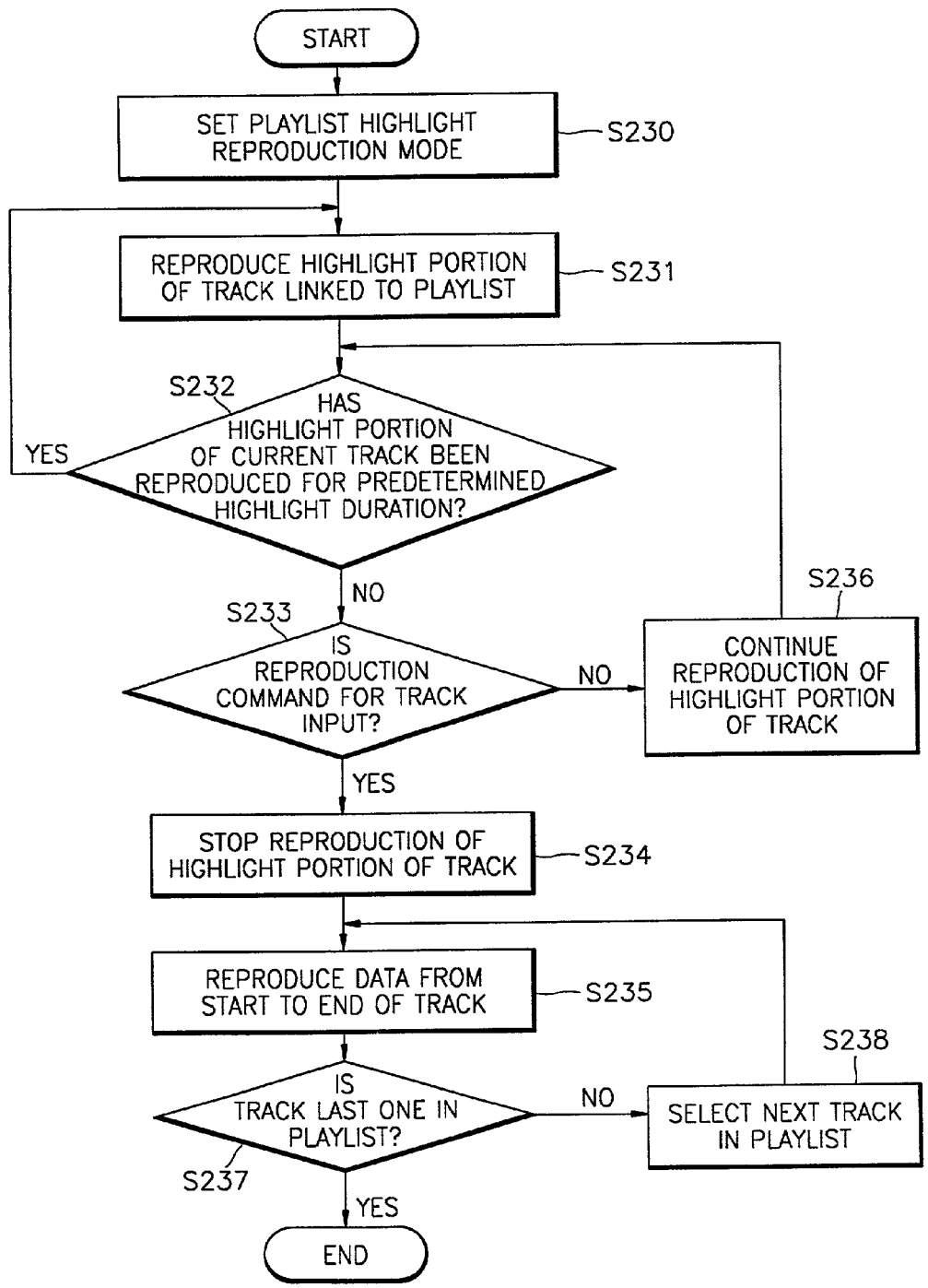
FIG. 10 is a flowchart illustrating a fourth embodiment of a method of reproducing an audio highlight portion according to the present invention.

In FIG. 10, which is a flowchart illustrating a fourth embodiment of a method of reproducing a highlight audio portion according to the present invention, once a playlist highlight reproduction mode is set at operation S230, the highlight portion of a track linked to a playlist is reproduced at operation S231. During the reproduction of the highlight portion, when a command for the data of the current track to be reproduced is input by a user at operation S233 before the highlight portion of the track is reproduced for a predetermined highlight duration, the reproduction of the highlight portion of the track is stopped at operation S234. Next, at operation S235, data from the start to the end of the track is reproduced. Alternatively, when the highlight portion of the track has been reproduced for the predetermined highlight duration at operation S232, the procedure goes back to the operation S231 to reproduce the highlight portion of the next track. When a reproduction command for the track is not input at operation S233, the reproduction of the highlight portion of the track is continued at operation S236, and the operations S232 and S233 are repeated.

After the operation S235, it is determined whether the track is the last one linked to the playlist at operation S237. When it is determined that the track is not the last one, the next track linked to the playlist is selected at operation S238, and the procedure goes back to the operation S235 to reproduce data from the start to the end of the track. However, when it is determined that the track is the last one, the playlist highlight reproduction mode ends.

In the reproduction method of FIG. 10, when a track data reproduction command is input by a user while the highlight portion of one of the tracks linked to a playlist is being reproduced, data is reproduced from the current track when the command is input through the last track. However, this method can be modified such that the playlist highlight reproduction mode is terminated after the data is reproduced from only the current track when the command is input by the user, or the procedure goes back to the operation S231 to reproduce the highlight portion of the next track linked to the playlist, without performing the operations S237 and S238.

Figure 11:
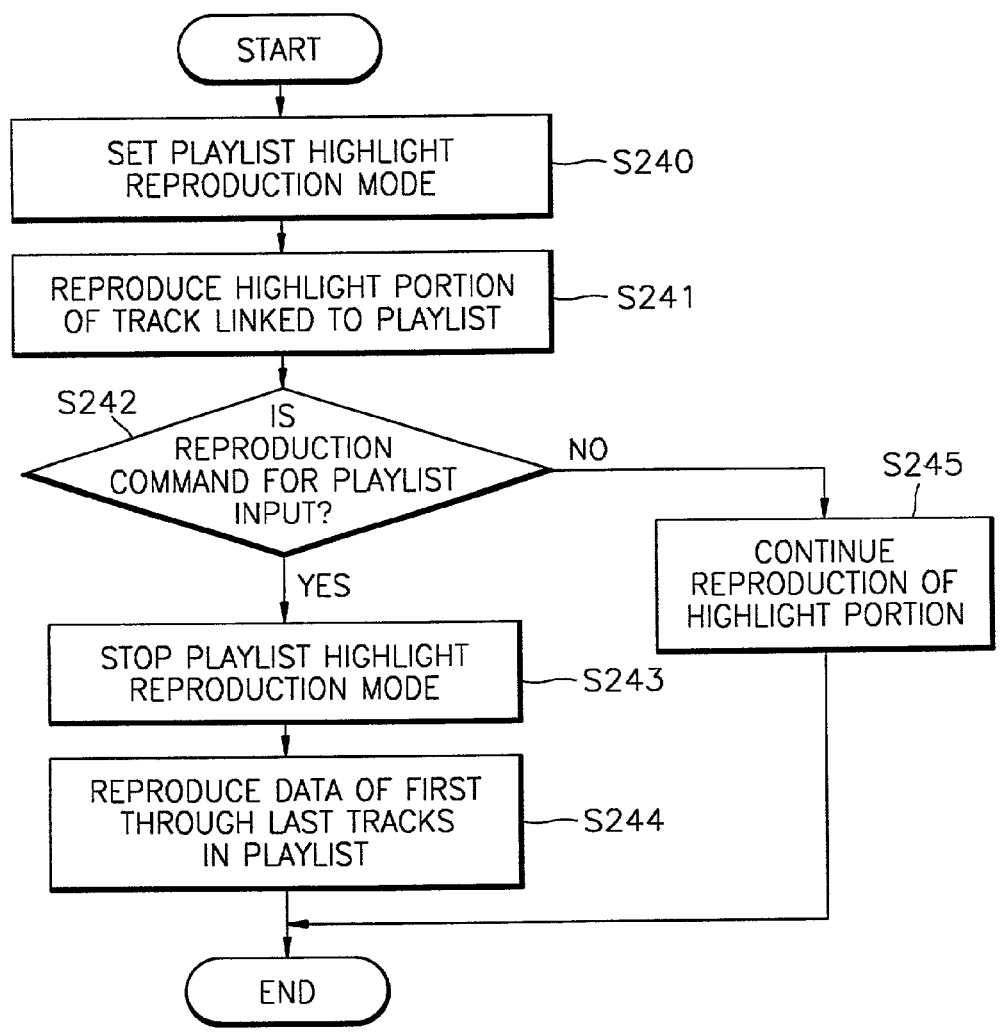
FIG. 11 is a flowchart illustrating a fifth embodiment of a method of reproducing an audio highlight portion according to the present invention.

In FIG. 11, which is a flowchart illustrating a fifth embodiment of a method of reproducing an audio highlight portion according to the present invention, once a playlist highlight reproduction mode is set at operation S240, the highlight portions of tracks linked to a playlist are reproduced at operation S241. During the reproduction of the highlight portions of the tracks, when a reproduction command for the playlist is input by a user at operation S242, the playlist highlight reproduction mode is stopped at operation S243. Then, at operation S244, data of all tracks, that is, first through last tracks, linked to the playlist is reproduced. When the reproduction command for the playlist is not input at operation S242, the reproduction of the highlight portions of the tracks linked to the playlist is continued at operation 245.

Figure 12:
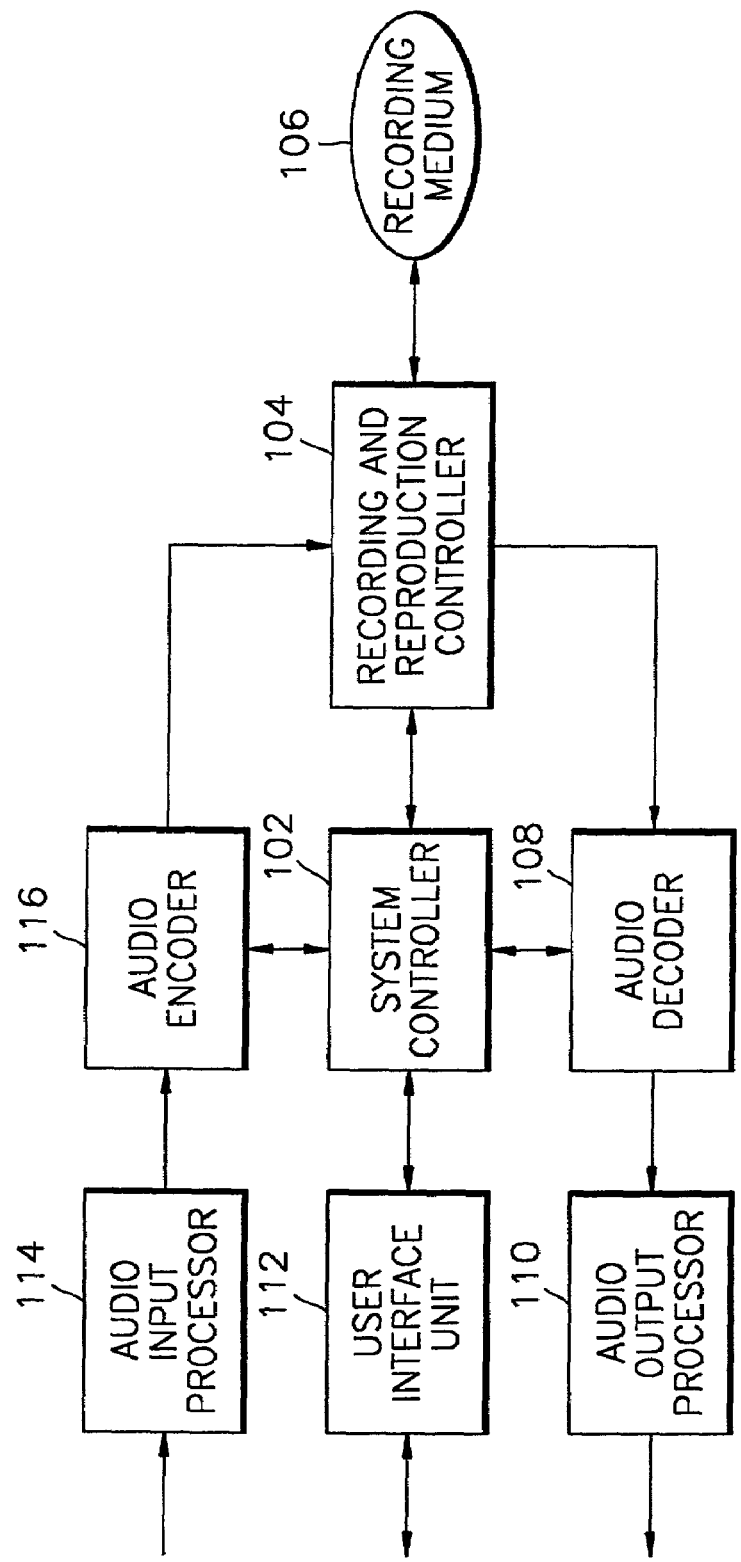
FIG. 12 is a block diagram illustrating a first embodiment of an apparatus for recording an audio highlight portion according to the present invention.

FIG. 12 is a block diagram illustrating a first embodiment of an apparatus for recording an audio highlight portion according to the present invention. FIG. 12 shows an audio recording and reproducing apparatus for recording the highlight portion of a track desired by a user while reproducing data of audio tracks from a recording medium.

A system controller 102 generates a command for the data of a track to be reproduced in response to a command input by a user through a user interface unit 112. In response to the command, a recording and reproduction controller 104 reads the data of the track from a recording medium 106 and provides the data to an audio decoder 108. The audio decoder 108 decodes the audio data provided from the recording and reproduction controller 104 and provides decoded audio data to an audio output processor 110. The audio output processor 110 outputs the decoded audio data in the form of an audio signal suitable for an output apparatus.

While listening to the audio signal output from the audio output processor 110, if the user inputs a command for designating a desired portion as a highlight portion, the command is provided to the system controller 102 through the user interface unit 112. In response to the command input by the user through the user interface unit 112, the system controller 102 controls the recording and reproduction controller 104 to record highlight portion information to the recording medium 106 as the track information of the track.

In the case of a DVD-audio recording format, highlight portion information is stored at the entry point of a highlight portion. Here, the entry point is included in a cell corresponding to the time when the highlight portion of a current track was selected by a user. Highlight portion start time information and highlight duration information or only the highlight portion start time information may be recorded at the entry point.

The system controller 102 may generate a playlist comprising link information for linking to the playlist a plurality of tracks, for which highlight portions are designated, and record the playlist to the recording medium 106. Independent highlight portion information is not included in the playlist, and the highlight portion information of each track linked to the playlist is stored at an entry point included in a cell of the same track, as shown in FIG. 4B.

Figure 13:
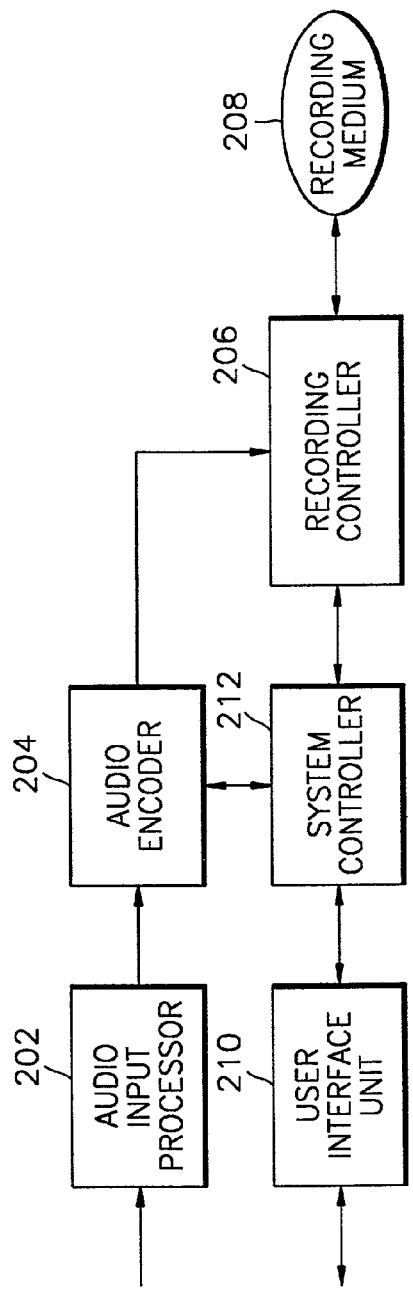
FIG. 13 is a block diagram illustrating a second embodiment of an apparatus for recording an audio highlight portion according to the present invention.

The audio input processor 114 and the audio encoder 116 of FIG. 12 perform the same operations as an audio input processor 202 and an audio encoder 204 of FIG. 13, and thus they are described in FIG. 13.

FIG. 13 is a block diagram illustrating a second embodiment of an apparatus for recording an audio highlight portion according to the present invention. The recording apparatus of FIG. 13 records audio track information and highlight portion information to a recording medium.

The audio input processor 202 processes input audio data so that the input audio data can be encoded by an audio encoder 204. The audio encoder 204 encodes the audio data received from the audio input processor 202 and records encoded data to a recording medium 208 through a recording controller 206.

In the course of recording the encoded data, when a user inputs through a user interface 210 a command for designating as a highlight portion a desired portion on a current track, the encoded data of which is being recorded, a system controller 212 receives the command and records highlight portion information of the current track to the recording medium 208 through the recording controller 206.

In the case of the DVD-audio recording format, highlight portion information is stored at an entry point of a highlight portion designated by a user, which is included in a cell corresponding to the highlight portion on a track of a recording medium. Highlight portion start time information and highlight duration information or only the highlight portion start time information may be recorded at the entry point.

Figure 14:
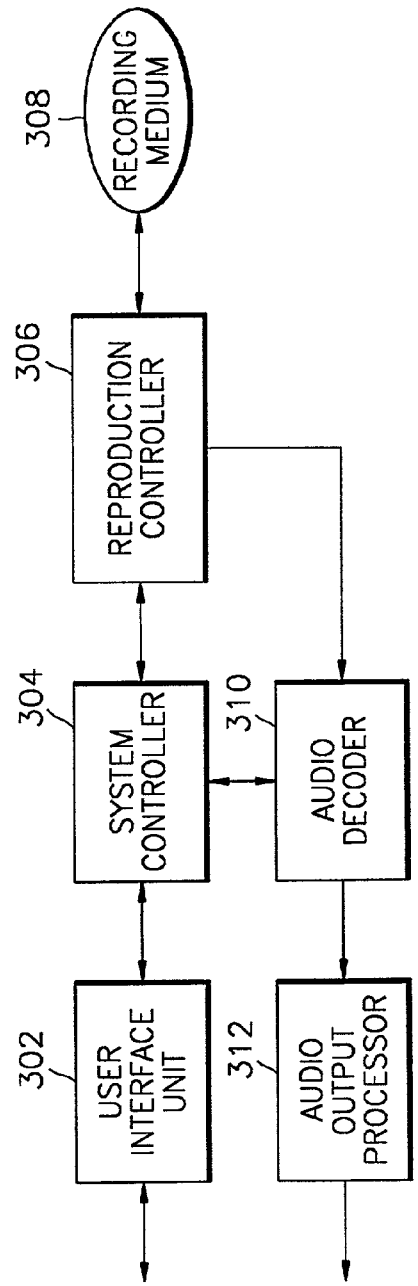
FIG. 14 is a block diagram illustrating an embodiment of an apparatus for reproducing an audio highlight portion according to the present invention.

FIG. 14 is a block diagram illustrating an embodiment of an apparatus for reproducing an audio highlight portion according to the present invention.

When a user requests the reproduction of the highlight portion of a particular track through a user interface 302, a system controller 304 analyzes information on the track and the highlight portion information of the track read from a recording medium 308 through a reproduction controller 306. The system controller 304 finds the position of data corresponding to a time indicated by the analyzed highlight portion information and instructs the reproduction controller 306 to read data from a recording medium 308 starting from the found position. Here, the user interface 302 interfaces between the user and the system controller 304 to allow the user to set a highlight reproduction mode through a menu illustrated in FIG. 3A, 3B or 3C.

Under the control of the system controller 304, the reproduction controller 306 reads the highlight portion of the track from the recording medium 308 for a duration indicated by highlight portion duration information and provides the read highlight portion to an audio decoder 310. The audio decoder 310 decodes data of the highlight portion read from the track and provides decoded data to an audio output processor 312. The audio output processor 312 processes the decoded audio data to output an audio signal suitable for an output apparatus. Here, the reproduction controller 306, the audio decoder 310 and the audio output processor 312 can be referred to as a reproduction processor.

Each of the recording media 106, 208 and 308 of FIGS. 12 through 14 includes an audio area to which audio data of a track is recorded and a predetermined area for storing reproduction related information used for reproducing only a highlight portion of the audio track designated by a user. The reproduction related information includes information described in the above embodiments. The predetermined area may be an entry point of a cell in a track.

Unlike a conventional intro function, as described above, the present invention allows a user to designate a particular portion of a track as a highlight portion so that the user can easily identify the music of a track within a short time even if many pieces of music are recorded to individual audio tracks on a recording medium.

In the case of a playlist to which a plurality of audio tracks are linked through link information, the present invention continuously reproduces the highlight portions of the individual audio tracks so that a user can easily identify music which has been recorded to the audio tracks linked to the playlist.

The present invention may realize the above effects in association with a visual menu. In addition, the present invention links reproduction of a highlight portion with a user's selection of reproduction, thereby allowing more interactive reproduction as compared to a conventional method.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A recording/reproducing method to be used with a recording/reproducing apparatus acting on an information storage medium having a plurality of tracks, the method comprising:
    designating a particular portion of a particular track as a representative portion of the track when recording data to the track of the medium; and
    recording reproduction related information, to allow the apparatus to reproduce the representative portion, to a predetermined area on the medium.

2. The recording method according to claim 1, wherein the reproduction related information comprises start time information and duration information for the representative portion.

3. The recording method according to claim 1, wherein the reproduction related information comprises start time information for the representative portion.

4. The recording method according to claim 3, wherein the reproduction related information further comprises duration information for the representative portion.

5. A recording method comprising:
    designating a particular portion on a track as a representative portion of the track when recording or reproducing data to or from a recording medium including a plurality of tracks; and
    recording reproduction related information, for reproducing the representative portion, to a predetermined area on the recording medium, wherein the reproduction related information is recorded on the recording medium using an entry point on the track for which the representative portion is designated in a digital versatile disc (DVD)-audio format.

6. A recording method comprising:
    designating a particular portion on a track as a representative portion of the track when recording or reproducing data to or from a recording medium including a plurality of tracks; and
    recording reproduction related information, for reproducing the representative portion, to a predetermined area on the recording medium, further comprising:
    designating a particular portion on each of the plurality of tracks as a representative portion of a respective track;
    storing playlist information comprising information for linking the respective tracks for which representative portions are designated to the predetermined area on the recording medium.

7. The recording method according to claim 1, wherein the recording method is applied to a recording medium including at least one audio track.

8. A method of reproducing data from a recording medium including a plurality of tracks, the method comprising:
    designating representative portions to represent some or all of the tracks to which reproduction related information for reproducing the representative portions is recorded;
    reading from the recording medium the reproduction related information of the representative portion requested to be reproduced;
    analyzing the reproduction related information; and
    reproducing the representative portion requested to be reproduced based on the analyzed reproduction related information.

9. The method according to claim 8, wherein the reproducing of the representative portion comprises reproducing the representative portion starting from a position indicated by start time information included in the analyzed reproduction related information for a duration indicated by duration information included in the analyzed reproduction related information.

10. The method according to claim 8, wherein the reproducing of the representative portion comprises reproducing the representative portion starting from a position indicated by start time information included in the analyzed reproduction related information for a duration which has been previously set.

11. The method according to claim 8, wherein the reading from the recording medium comprises setting a mode of reproducing the representative portion of a single track displayed on a menu, wherein the representative portion of a selected track is reproduced in the reproducing of the representative portion where the mode is set.

12. The method according to claim 8, wherein the reading from the recording medium comprises setting a mode of reproducing the representative portions of all tracks displayed on a menu, wherein the representative portions of all the tracks on the recording medium are reproduced in the reproducing of the representative portion where the mode is set.

13. The method according to claim 12, wherein in the reproducing of the representative portion, a predetermined portion of a track for which a representative portion is not designated on the recording medium is reproduced for a predetermined duration.

14. The method according to claim 8, wherein the reading from the recording medium comprises setting a mode of reproducing the representative portions of a plurality of tracks linked to a playlist displayed on a menu, the playlist comprising link information for linking the plurality of tracks, wherein the representative portions linked to the playlist are sequentially reproduced in the reproducing of the representative portion where the reproducing mode is set.

15. The method according to claim 14, wherein the reproducing of the representative portion comprises reproducing a predetermined portion of a track, for which a representative portion is not designated, among the tracks linked to the playlist for a predetermined duration.

16. A method of reproducing data from a recording medium storing a playlist comprising information for linking a plurality of tracks, the recording medium on which representative portions for representing some or all the tracks are designated and to which reproduction related information for reproducing the representative portions is recorded, the method comprising:
  selecting a playlist and reading the reproduction related information of the representative portions of tracks linked to the selected playlist from the recording medium and analyzing the reproduction related information; and
  reproducing the representative portions of the tracks linked to the playlist based on the analyzed reproduction related information.

17. The method according to claim 16, further comprising reproducing all the data from a current track through the last track linked to the playlist where a reproduction command is input and the representative portions of the tracks linked to the playlist are being reproduced.

18. The method according to claim 16, further comprising reproducing the data from all the tracks linked to the playlist where a reproduction command is input in the course of reproducing the representative portion of each of the tracks linked to the playlist.

19. A recording and reproducing apparatus, comprising:
  an encoder/decoder to encode input data and to record encoded data to a recording medium including a plurality of tracks such that the recorded encoded data includes a designation of a representative portion of the encoded data and/or to decode data read from the recording medium;
  a system controller which generates reproduction related information to reproduce the representative portion of one of the tracks where the data is being recorded to or reproduced from the recording medium including a plurality of tracks; and
  a recording controller which records the reproduction related information to a predetermined area on the recording medium.

20. The recording and reproducing apparatus according to claim 19, wherein the reproduction related information comprises start time information and duration information for the representative portion.

21. The recording and reproducing apparatus according to claim 19, wherein the reproduction related information comprises start time information for the representative portion.

22. The recording and reproducing apparatus according to claim 21, wherein the reproduction related information further comprises duration information for the representative portion, the duration information being designated by the recording and reproducing apparatus.

23. The recording and reproducing apparatus according to claim 19, wherein the recording controller records the reproduction related information on the recording medium using an entry point on the track for which the representative portion is designated in a digital versatile disc (DVD)-audio format.

24. The recording and reproducing apparatus according to claim 19, wherein the track is an audio track.

25. An apparatus for reproducing data from a recording medium including a plurality of tracks, the apparatus comprising:
  a designator to designate representative portions of the tracks to represent some or all of the tracks on the recording medium;
  a recorder to record reproduction related information to reproduce the representative portions onto the recording medium;
  a system controller which reads the reproduction related information of the representative portion of a track request to be reproduced from the recording medium and analyzes the reproduction related information; and
  a reproduction processor which reads and reproduces the representative portion based on the analyzed reproduction related information.

26. The apparatus according to claim 25, wherein the reproduction processor reproduces data from the track, starting from a position indicated by representative portion start time information included in the analyzed reproduction related information for a duration indicated by representative portion duration information included in the analyzed reproduction related information.

27. The apparatus according to claim 25, wherein the reproduction processor reproduces data from the track, starting from a position indicated by representative portion start time information included in the analyzed reproduction related information for a duration which has been previously set.

28. The apparatus according to claim 25, further comprising a user interface unit which interfaces with the user using a menu, wherein a mode of reproducing the representative portion of a selected track is set through the menu and the reproduction processor reproduces the representative portion of the selected track.

29. The apparatus according to claim 25, further comprising a user interface unit which interfaces with the user using a menu, wherein a mode of reproducing the representative portions of all tracks on the recording medium is set through the menu and the reproduction processor reproduces the representative portions of all the tracks.

30. The apparatus according to claim 29, wherein the reproduction processor reproduces a predetermined portion of a track on which a representative portion is not designated on the recording medium for a predetermined duration.

31. The apparatus according to claim 29, further comprising a user interface unit for interfacing with the user using a menu, wherein a mode of reproducing the representative portions of a plurality of tracks linked to a desired playlist is set through the menu and the reproduction processor continuously reproduces the representative portions of all the tracks linked to the playlist.

32. The apparatus according to claim 31, wherein the reproduction processor reproduces a predetermined portion of a track, on which a representative portion is not designated, among the tracks linked to the playlist for a predetermined duration.

33. The apparatus according to claim 31, wherein the reproduction processor reproduces the data from a current track through the last track linked to the playlist where a reproduction command is input and the representative portions according to the playlist are being reproduced by the reproduction processor.

34. The apparatus according to claim 31, wherein the reproduction processor reproduces the data from all tracks linked to the playlist where a reproduction command is input and the representative portions according to the playlist are being reproduced by the reproduction processor.

35. A recording medium comprising:
  an area comprising a track to which data is recorded;
  an area within the track to be designated as the area in which a representative portion of the data is to be recorded; and
  a predetermined area onto which reproduction related information to reproduce the designated representative portion of the track is recorded.

36. The recording medium according to claim 35, wherein the reproduction related information comprises start time information and duration information for the representative portion.

37. The recording medium according to claim 35, wherein the reproduction related information comprises start time information for the representative portion.

38. The recording medium according to claim 35, the reproduction related information further comprises duration information for the representative portion.

39. The recording medium according to claim 35, wherein the reproduction related information is stored as an entry point information on the track for which the representative portion is designated in a digital versatile disc (DVD)-audio recording format.

40. The recording medium according to claim 35, further comprising a predetermined area to which playlist information is recorded, the playlist information comprising link information for linking a plurality of audio tracks on which representative portions are designated.

41. The recording medium according to claim 35, wherein the track is an audio track.

42. An audio product comprising:
a recording medium;
at least one audio selection recorded on the recording medium;
an area of the recording medium to be designated as the area on which a representative portion of the at least one audio selection is to be recorded;
data recorded on the recording medium which identifies a starting point of the representative portion of the at least one audio selection.

43. The audio product according to claim 42, wherein the starting point data is recorded in a cell associated with the audio selection.

44. The audio product according to claim 43, wherein the starting point of the sample portion differs from a starting point of the audio selection.

45. The audio product according to claim 42, wherein the data recorded on the recording medium further comprises data which identifies an end point of the representative portion.

46. The audio product according to claim 45, wherein the ending point for the representative portion differs from an end point of the audio selection.

47. A method of making an audio product comprising:
providing a recording medium;
recording at least one audio selection on the recording medium in cells;
identifying a starting point and an ending point of a sample portion of the audio selection; and
recording data which designates the starting point and the ending point of the sample portion in a cell associated with the audio selection.

48. The audio product according to claim 47, wherein the starting point of the sample portion differs from a starting point of the audio selection.

49. The audio product according to claim 47, wherein the ending point of the sample portion differs from an ending point of the audio selection.

50. A method of reproducing audio data from a recording medium, the method comprising:
designating a starting point and a reproduction duration of a sample portion of the audio data;
reproducing the sample portion from the designated starting point and for a duration not exceeding the designated reproduction duration; and
initiating reproduction of the audio data, beginning at a starting point of the audio data, before expiration of the reproduction duration.

51. A method of reproducing an audio selection from a recording medium which includes a plurality of audio selections, the method comprising:
designating a respective starting point and a respective reproduction duration of a sample portion of a respective audio selection
displaying a menu of the respective audio selections for which the designating data exists on the recording medium;
selecting one or more of the audio selections from the menu;
sequentially reproducing the sample portions corresponding to the selected audio selections for a duration not exceeding a respective reproduction duration, beginning the reproduction of each sample portion at the respective designated starting point; and
initiating reproduction of one of the selected audio selections from the beginning of the audio selection before expiration of the respective reproduction duration.

52. A method of reproducing audio data comprising:
providing a recording medium, including a plurality of audio selections, with data identifying audio samples representative of each of the audio selections;
sequentially reproducing the audio samples corresponding to the audio selections, according to a reproduction sequence; and
initiating reproduction of one of the selected audio selections from the beginning of the initiated audio selection after reproduction of at least a portion of the audio sample corresponding to the initiated selection.

53. A recording medium comprising:
a plurality of tracks each having data recorded thereon;
an area of each track to be designated as the area on which a representative portion of the at least one audio selection is to be recorded; and
highlight information designating sample portions of the data of at least some of the tracks.

54. The recording medium according to claim 53, wherein the data of each of the tracks is audio data.

* * * * *